J. DAIN.
MOWER.
APPLICATION FILED NOV. 2, 1905.
1,147,708.
Patented July 27, 1915.
10 SHEETS—SHEET 1.
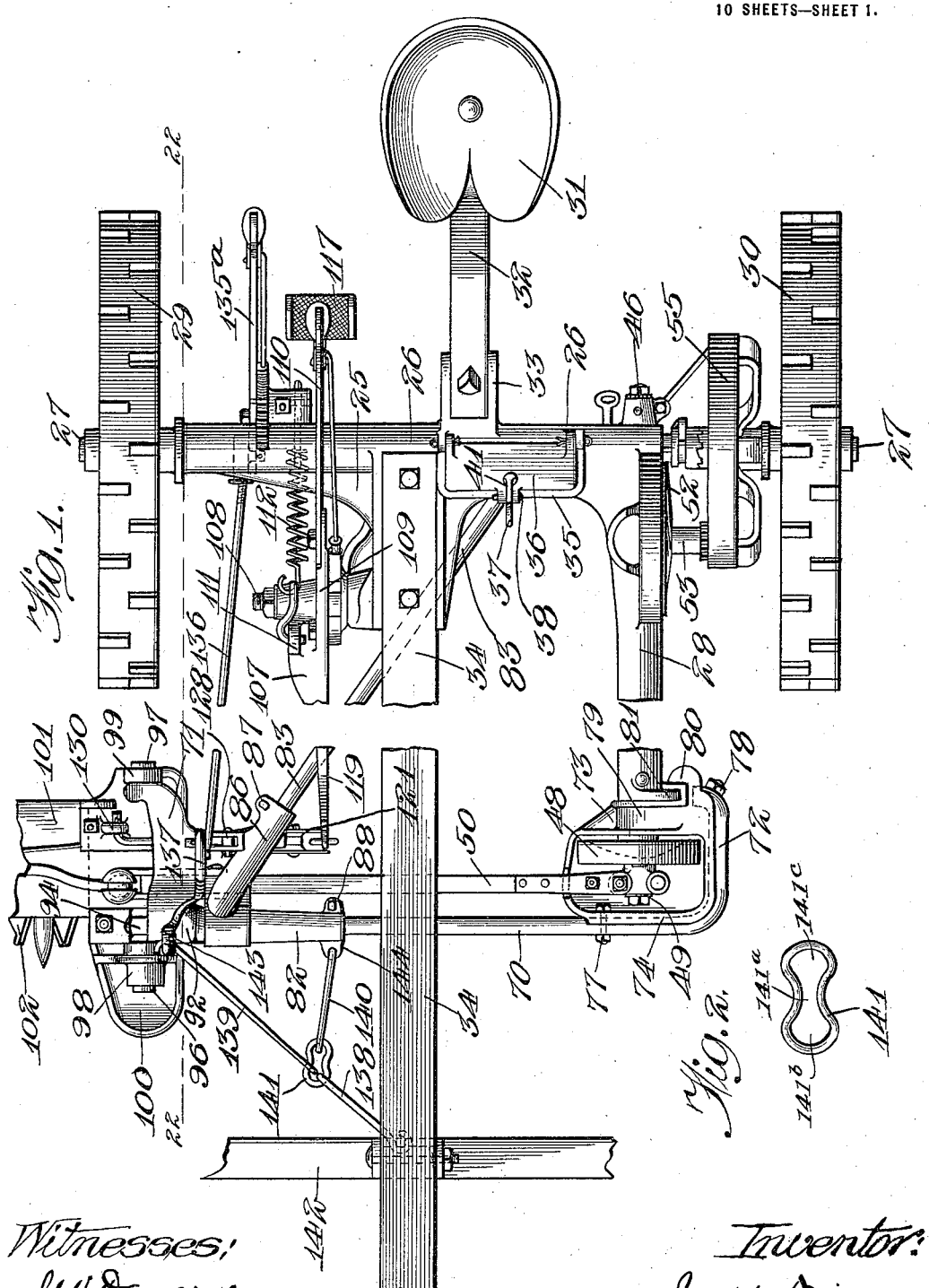

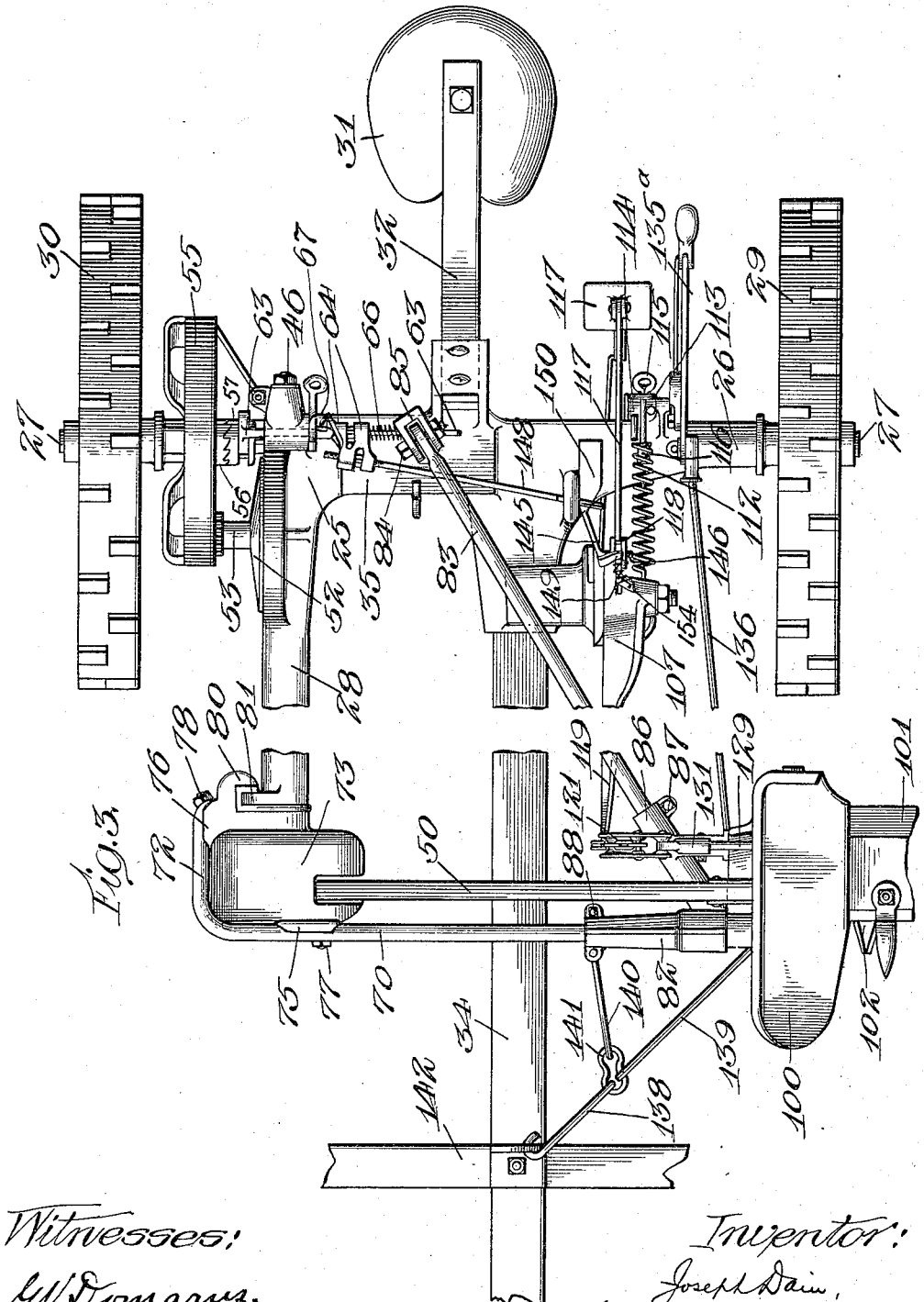

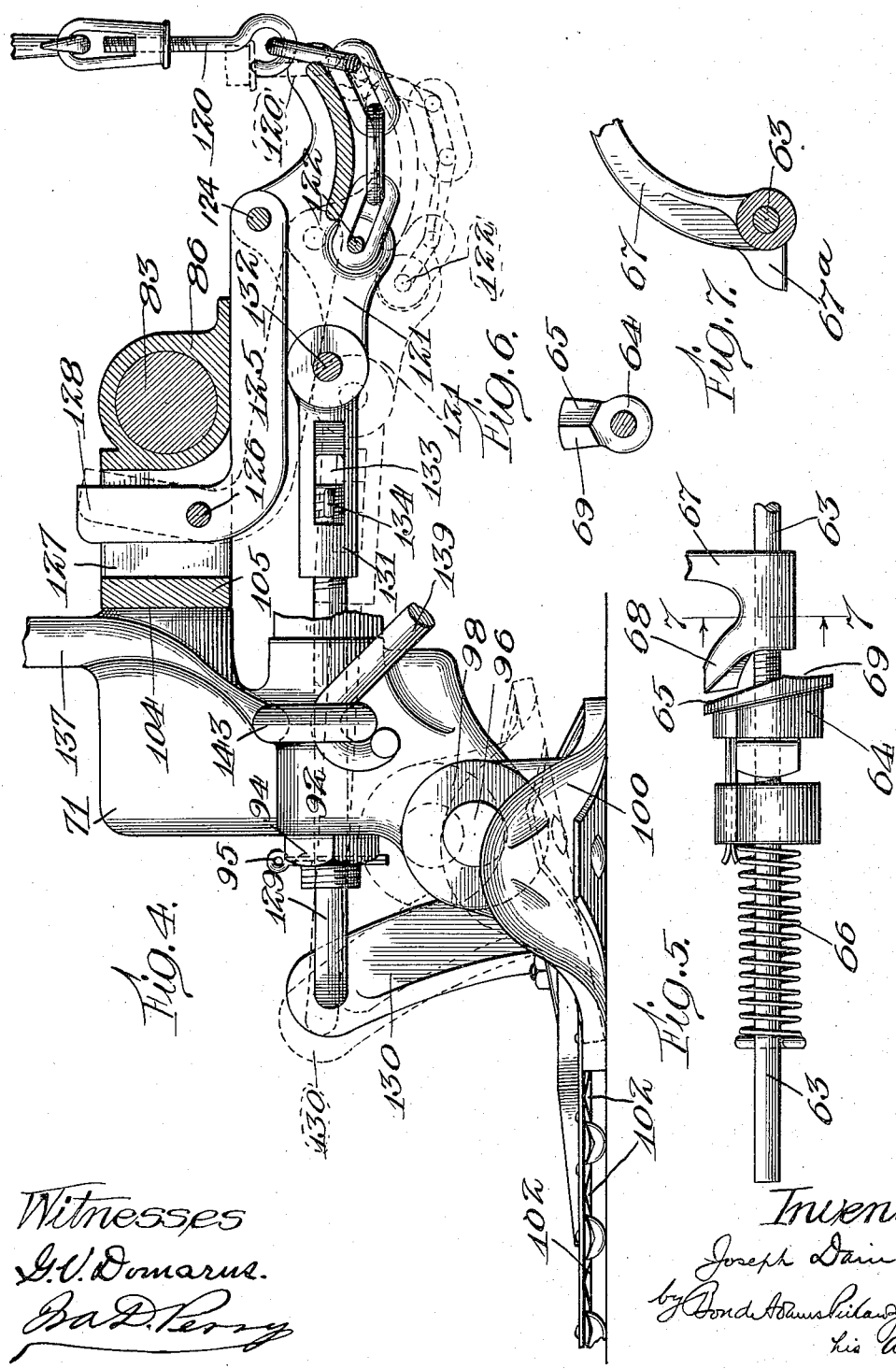

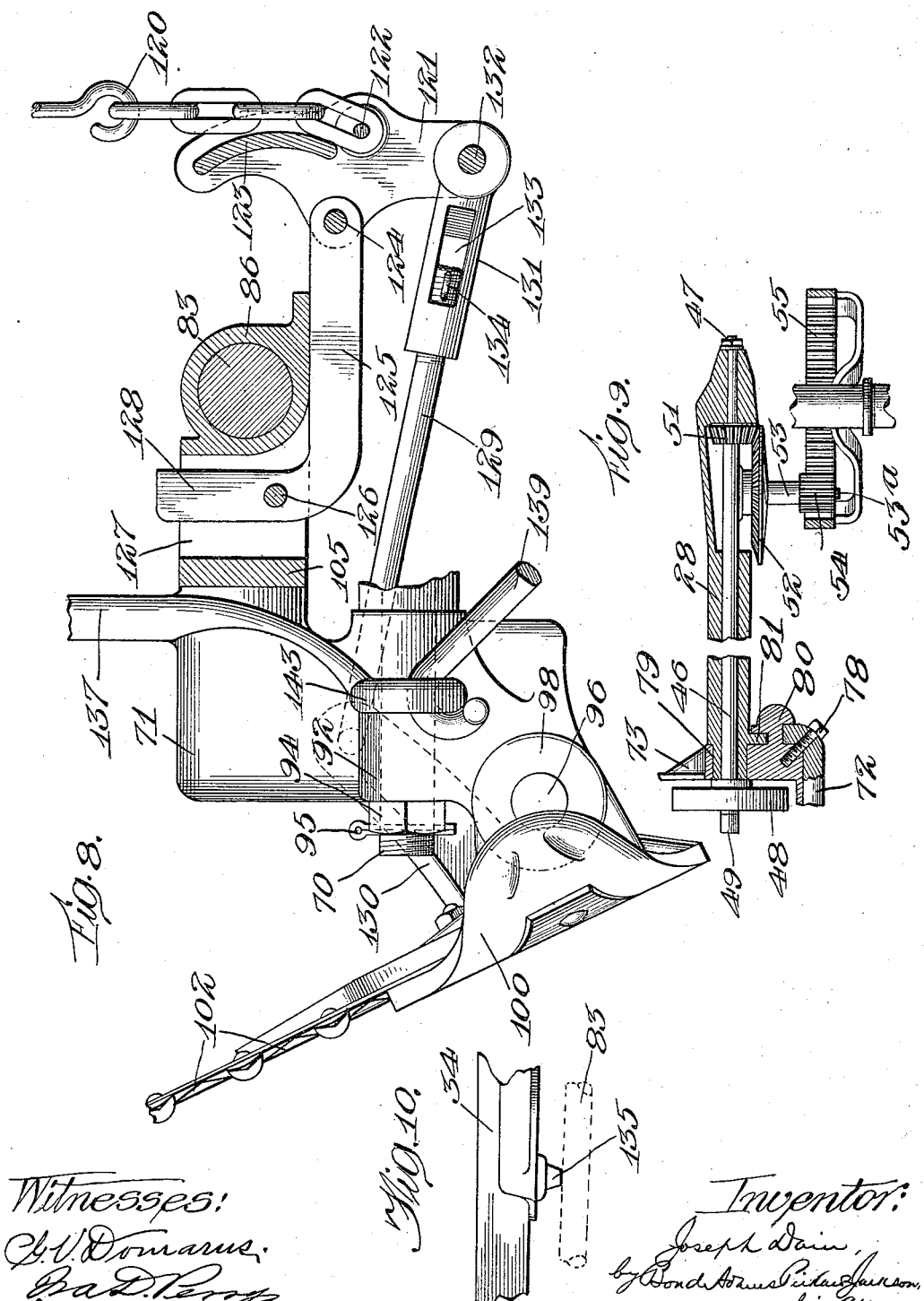

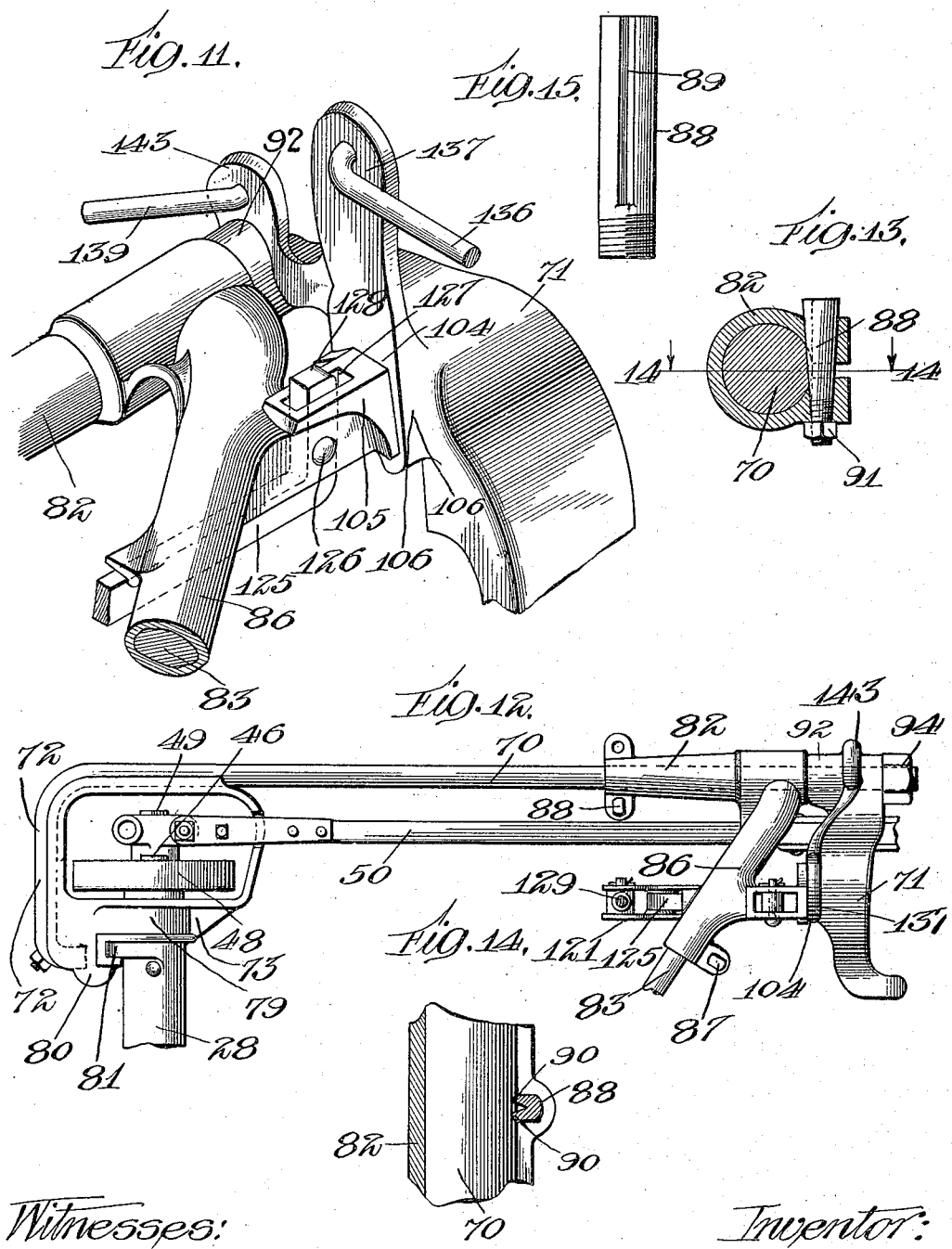

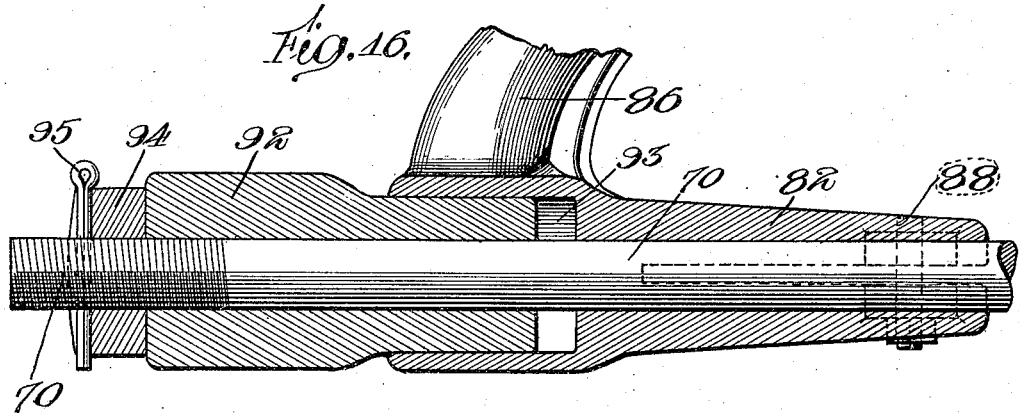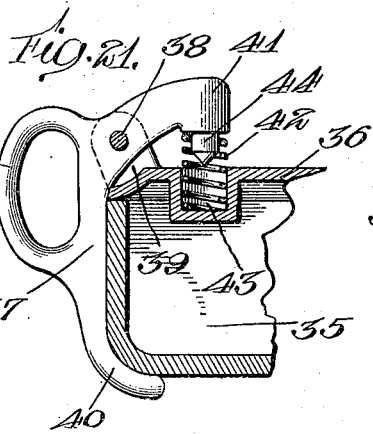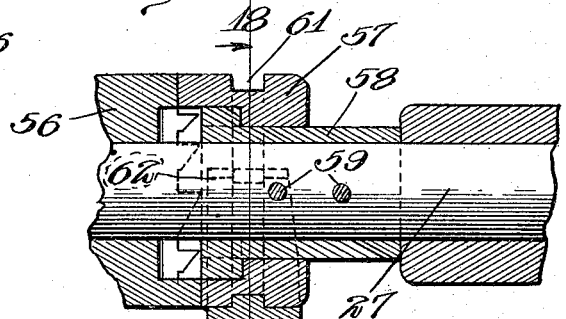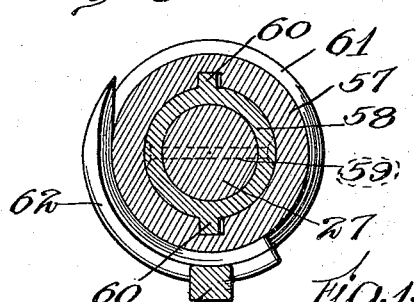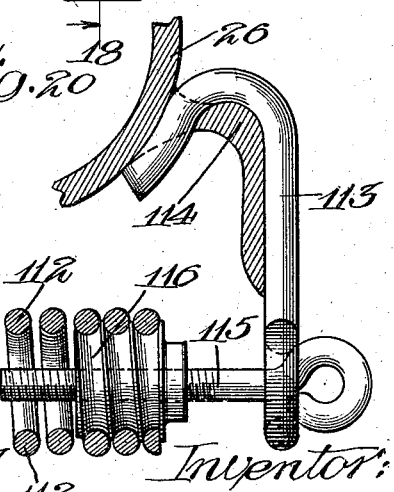

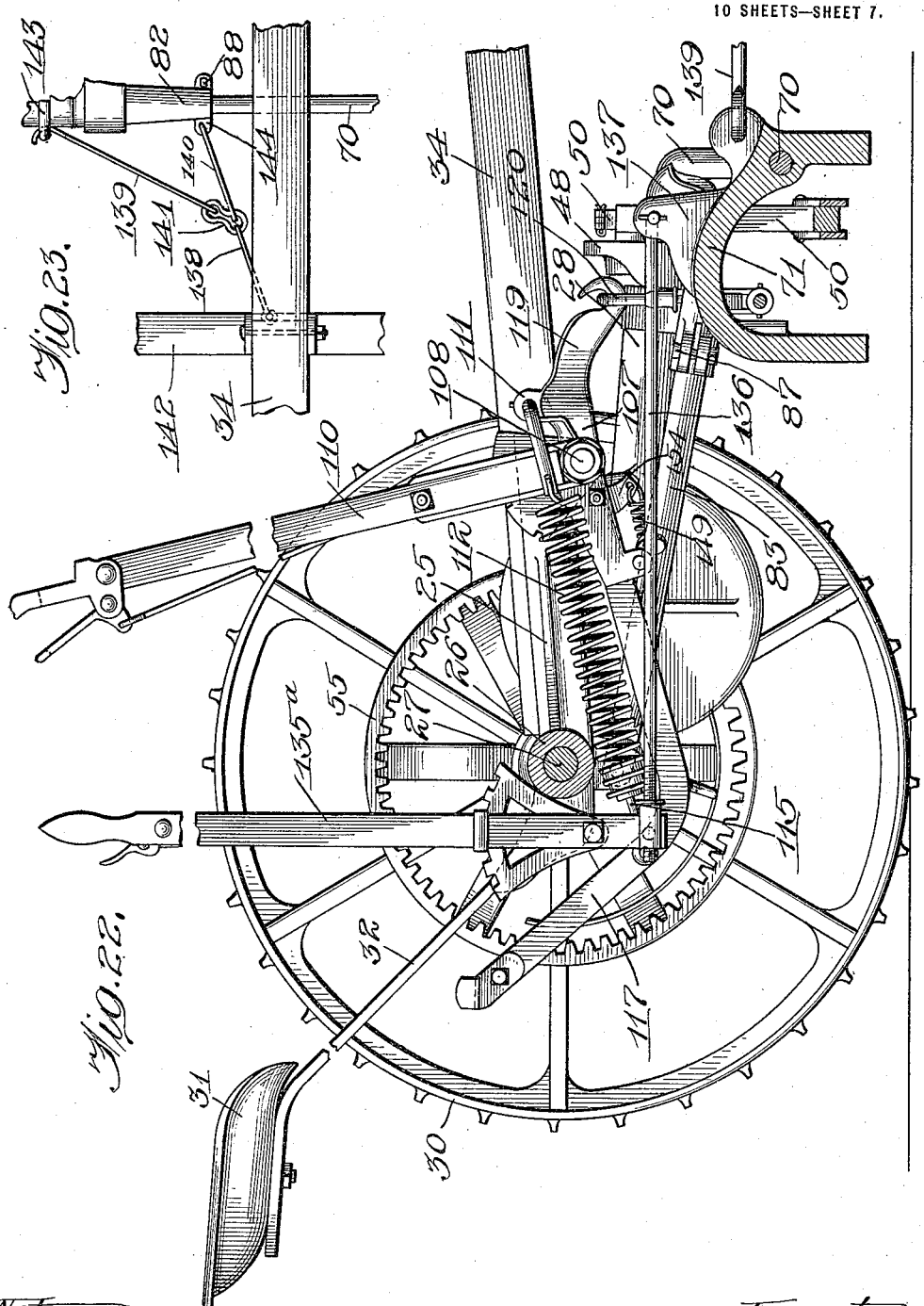

J. DAIN.
MOWER.
APPLICATION FILED NOV. 2, 1905.
1,147,708.
Patented July 27, 1915.
10 SHEETS—SHEET 8.
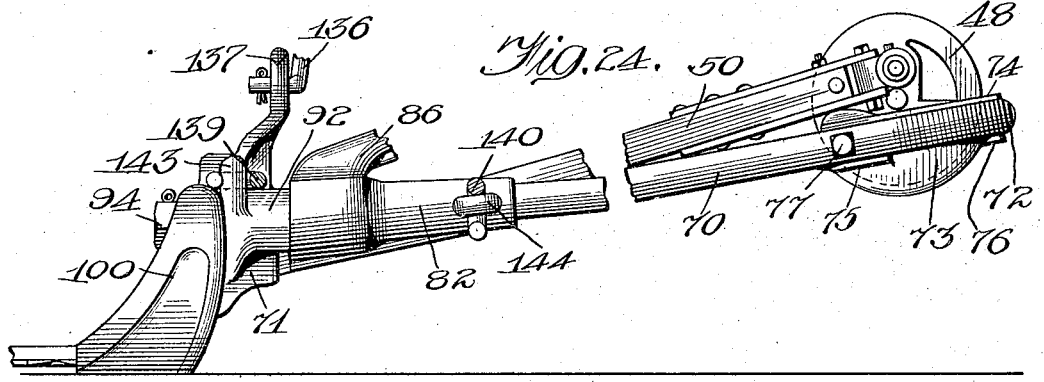
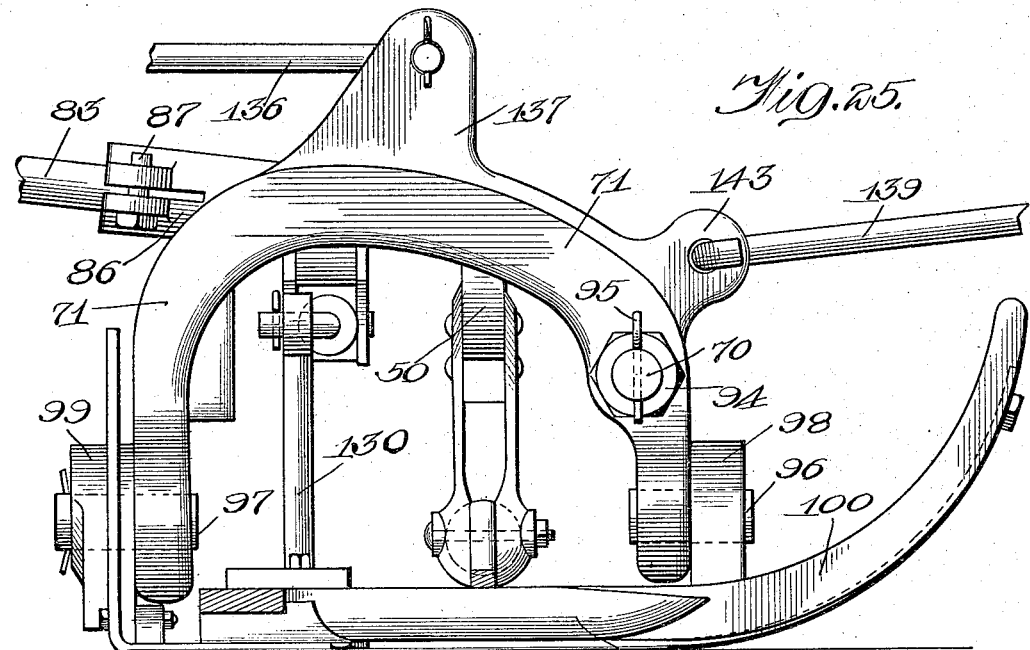
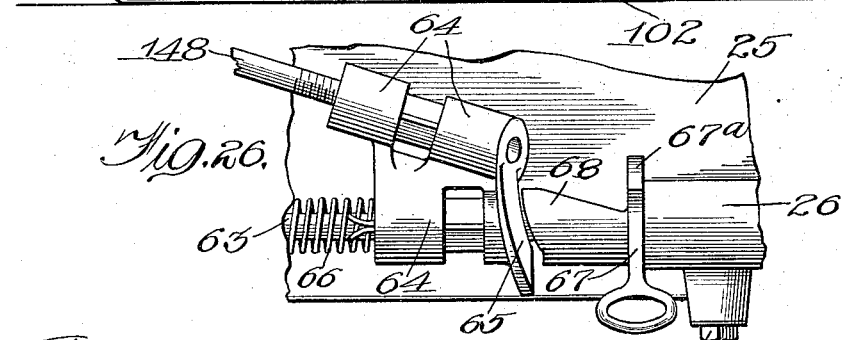

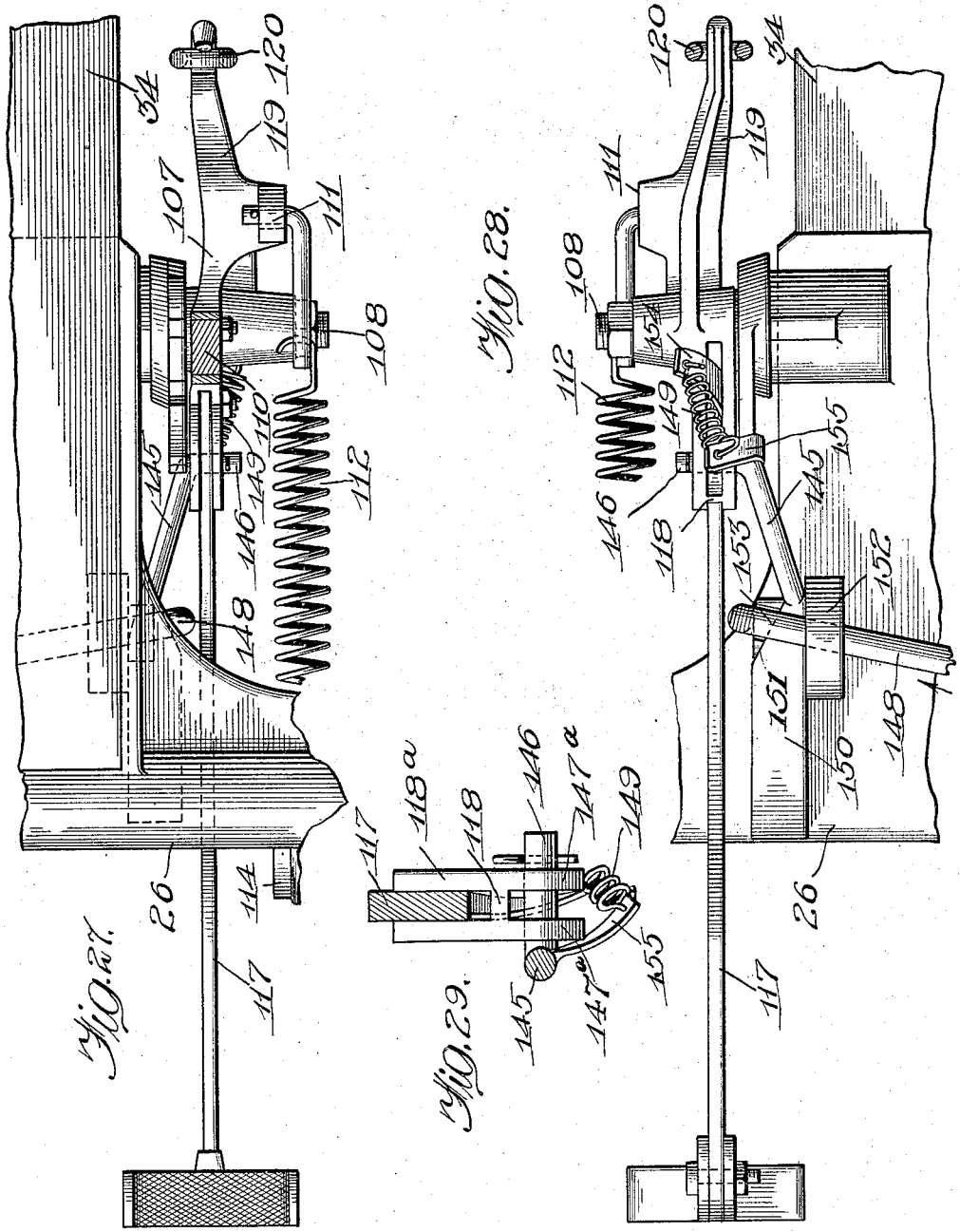

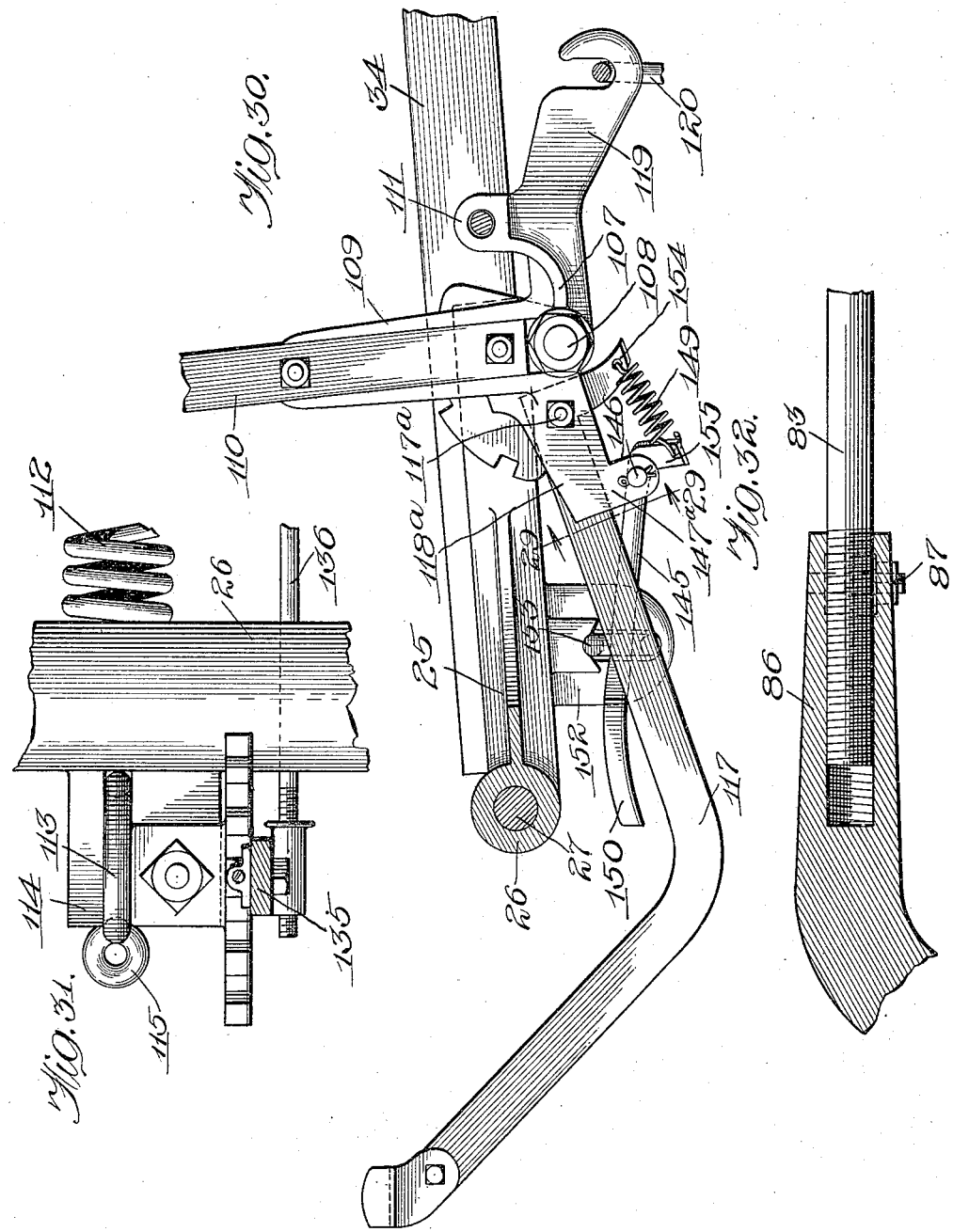

UNITED STATES PATENT OFFICE.

JOSEPH DAIN, OF OTTUMWA, IOWA, ASSIGNOR, BY MESNE ASSIGNMENTS, TO DEERE & COMPANY, OF MOLINE, ILLINOIS, A CORPORATION OF ILLINOIS.

MOWER.

1,147,708.      Specification of Letters Patent.      Patented July 27, 1915.

Application filed November 2, 1905. Serial No. 285,592.

*To all whom it may concern:*

Be it known that I, JOSEPH DAIN, a citizen of the United States, residing at Ottumwa, in the county of Wapello and State of Iowa, have invented certain new and useful Improvements in Mowers, of which the following is a specification, reference being had to the accompanying drawings.

My invention relates to mowers, and has for its object to provide certain improvements by which the mower is made more substantial in construction as well as more efficient in operation.

My said improvements relate principally to the construction of the frame of the mower, the mounting of the finger-bar, the construction and arrangement for lifting the finger-bar to an intermediate or an upright position, to the mechanism for driving the cutter-bar, to the connections by which the driving mechanism is automatically disconnected when the finger-bar is raised to a more or less nearly vertical position, and to the draft connections.

In addition to these more important features my invention also includes certain other improvements, as will hereinafter more fully appear.

I accomplish my object as illustrated in the drawings and hereinafter fully described.

What I regard as new is set forth in the claims. In the accompanying drawings,—Figure 1 is a plan view of my improved mower, certain parts being broken away; Fig. 2 is a plan view of the draft link; Fig. 3 is an under-side view of the mower, certain parts being broken away; Fig. 4 is a detail, certain parts being in section, illustrating the arrangement of certain portions of the mechanism for lifting the finger-bar; Fig. 5 is a detail illustrating part of the mechanism for throwing the driving mechanism out of operation; Fig. 6 is a detail illustrating a part of the finger shown at the right in Fig. 5; Fig. 7 is a section on line 7—7 of Fig. 5; Fig. 8 is a view similar to Fig. 4, illustrating the finger-bar in its raised position; Fig. 9 is a view showing the driving gears; Fig. 10 is a partial view of the tongue showing the thrust-bar bearing; Fig. 11 is a perspective view illustrating the connections between the shoe, the drag-bar and the thrust-bar; Fig. 12 is a detail, being a plan view illustrating the front portion of the frame and connections; Fig. 13 is a sectional view illustrating the device for securing together the members of the drag-bar; Fig. 14 is a vertical section on line 14—14 of Fig. 13; Fig. 15 is an elevation of the bolt illustrated in Figs. 13 and 14; Fig. 16 is a sectional view illustrating the connections between the drag-bar and the thrust-bar; Fig. 17 is a sectional view illustrating the clutch by which the driving gears are connected with the main axle; Fig. 18 is a section on line 18—18 of Fig. 17; Fig. 19 is a plan view of some of the parts shown in Fig. 17; Fig. 20 is a sectional detail illustrating the devices for connecting up the rear end of the lifting spring; Fig. 21 is a view, partly in section, illustrating the tool-box latch. Fig. 22 is substantially a longitudinal vertical section on line 22—22 of Fig. 1; Fig. 23 is a plan view, illustrating the alternative arrangement of the draft link and its connections; Fig. 24 is a front view of the drag bar and adjacent parts; Fig. 25 is an enlarged detail, being a side view of the shoe bracket, the finger bar being in section; Fig. 26 is an under-side view, showing parts of the mechanism for throwing the clutches into and out of operation; Fig. 27 is a plan view of that part of the lever mechanism for raising and lowering the finger bar which is shown in Fig. 30, the lever being in section; Fig. 28 is an under-side view of the parts shown in Fig. 27; Fig. 29 is a cross-section on line 29—29 of Fig. 30; Fig. 30 is a side elevation of part of the lever mechanism for raising and lowering the finger bar; Fig. 31 is an enlarged detail, being a plan view, partly in section, illustrating the connections of the lever for rocking the shoe to change the fore and aft inclination of the shoe; and Fig. 32 is a detail, partly in section, illustrating the connection between the thrust bar of the frame and the front portion of the machine.

Referring to the drawings,—25 indicates the frame of the machine, which consists principally of a transverse sleeve 26, in which is mounted the axle 27, and a longitudinally-extending sleeve 28 at the left-hand end of the sleeve 26, as shown in Fig.

1. The carrying-wheels 29—30 are mounted on the ends of the axle 27 and are connected therewith by ratchet mechanism in the usual way, so that they rotate the axle only when they rotate in a forward direction.

31 indicates the seat, which is mounted on a spring-support 32 in the usual way,—the latter being secured to a bracket 33 projecting rearwardly from the sleeve 26.

34 indicates the tongue, which is secured to the frame 25 in the usual way, and is arranged substantially centrally thereof.

35 indicates the tool-box which is mounted on or formed as a part of the frame 25, and is provided with a hinged cover 36, as shown in Fig. 1. Said cover is provided with a latch 37, which, as best shown in Fig. 21, is pivoted between its ends on a suitable pivot 38 which is secured in supporting lugs 39 carried by the forward edge of the lid or cover 36. Said latch is provided with an arm 40, which extends down under the lower front edge of the box 35, and with an upward-extending arm 41 which projects over the front edge of the lid, as shown in said figure. A spring 42 rests in a suitable socket 43 in the lid and engages a tooth 44 projecting downward from the arm 41. A handle 45 is provided for moving the latch. The spring 42 bears upwardly on the arm 41 thereby throwing the arm 40 down against the lower edge of the tool-box in the manner illustrated in Fig. 1, but the lid may be released by simply rocking the latch on its pivot.

46 (see Figs. 1 and 9) indicate a crank shaft mounted in the sleeve 28 and extending longitudinally of the machine having also a bearing at its rear end in the machine frame, as shown in Fig. 9. Said shaft carries at its rear end a nut 47 which bears against the rear end of the sleeve 28 and serves to hold the shaft properly in position. The sleeve 28 and shaft 46 occupy an inclined position extending forward and downward from the sleeve 26 in the usual way. At its forward end the shaft 46 carries a crank disk 48 having a wrist pin 49 to which is connected a pitman 50, as shown in Figs. 12 and 24. Near its rear end the shaft 46 carries a bevel gear 51, which is arranged forward of the axle 27 and meshes with a beveled pinion 52 at one end of a short sleeve or hub 53, which carries at its other end a spur gear 54, as shown in Fig. 9. Said parts are best formed integral with each other and are carried on a shaft 53ª, as shown in Fig. 9. The latter meshes with an internal gear 55, which is mounted loosely on the axle 27. The advantage of putting the bevel gear 51 in front of the axle is that by that means I avoid extending the frame to the rear of the axle to support said gear, thereby reducing the cost of manufacture, since the size of the flask is reduced, thereby reducing the floor space used in making the cast as well as the quantity of sand necessary for making the mold. As best shown in Figs. 1 and 17, the gear 55 is connected with a sleeve 56 which may be the hub of said gear and forms one section of a clutch by which said gear is rotated. 57 indicates the other member of said clutch, which is in the form of a collar mounted on a sleeve 58 which is fixedly secured to the axle 27 by any suitable means, such as rivets or pins 59. (See Figs. 17 and 18). The sleeve 58 is provided with one or more, preferably two, inclined feathers 60 on its outer surface,—the collar 57 being correspondingly grooved so that said collar may move into and out of engagement with the other clutch section 56. The object of providing the inclined feathers is to apply an end thrust to the collar 57 and thereby hold it normally in engagement with the other clutch member 56. The feathers 60 are, therefore, inclined in the direction shown in Fig. 19,—the direction of rotation of the shaft being indicated by the arrow in said figure. For moving the collar or clutch section 57 out of engagement with the clutch section 56, it is provided with an external groove 61, in which fits a yoke 62 having a laterally-extending rod 63, best shown in Figs. 18 and 3. Said rod extends parallel with and under the axle 27, as shown in Figs. 18 and 3. Said rod carries a head 64 having an inclined face 65, as best shown in Figs. 3, 5 and 26. The head 64 is fixedly secured to the rod in any suitable manner.

66 indicates a spring mounted on the rod 63 and acting to press the clutch section 57 toward the clutch section 56.

67 indicates a hand-lever mounted on the rod 63 adjacent to the inclined face 65 of the head 64, as best shown in Figs. 5 and 26, and provided with a finger 68 which is adapted to bear against said inclined face to force the head 64 to one side and move the clutch section 57 out of engagement with the clutch section 56. Beyond the inclined face 65 the head 64 is provided with a depressed portion 69, which receives the finger 68 when the lever 67 has been rocked to the limit of its movement, thereby holding said lever in such position and locking the clutch section 57 out of operative position.

67ª indicates a lug carried by the lever 67, which is adapted to engage an adjacent portion of the frame of the machine when the lever 67 is depressed to a certain point, thereby acting as a stop to limit the downward movement of said lever. In addition to the lever 67 automatic mechanism is provided for throwing the clutch sections 56 and 57 out of operative position, which mechanism is hereinafter fully described.

The front portion of the frame of the machine consists of a drag-bar 70, which extends transversely of the machine from the crank disk 48 to near the shoe bracket 71. The end of the drag-bar nearest the crank disk is bent, or otherwise formed substantially at right angles with the main portion thereof, as shown at 72 in Fig. 1, so that said end portion of the drag-bar fits closely against and partly embraces a casting 73 which not only connects the drag-bar with the sleeve 28 but also forms a partial housing for the crank disk, as shown in Figs. 1, 3 and 24. As also shown in said figures, the casting 73 is provided with upper and lower flanges 74—75—76, which together form a groove to receive the drag-bar 70. Bolts 77—78 connect the drag-bar rigidly with the casting 73. Said casting is provided with a collar 79, preferably cast integral therewith, as shown in Fig. 12 which forms an end bearing against which the lower end of the sleeve 28 fits and into which an extension thereof projects. It is also provided with an overhanging lip 80 which overlaps a lug 81 projecting laterally from the lower end of the sleeve 28, as shown in Figs. 1 and 3. The lip 80 holds the casting 73 on the sleeve 28, but does not interfere with its slight pivotal movement on said sleeve.

By carrying the end of the drag-bar around the crank disk and connecting it pivotally to the inclosing sleeve or boxing which carries the drive shaft, I am able to secure the combined advantages incident to the connection of the drag-bar back of the crank disk, together with all those incident to the connection of the drag-bar with the front of the shoe. Heretofore it has been generally recognized that it is desirable to have the drag-bar connected to the front of the shoe so as to get a drawing cut, and it has also been generally understood that it is advantageous to connect the drag-bar to the frame back of the crank disk, but so far as I am aware no one has heretofore produced a construction in which the advantages incident to both arrangements have been secured in one machine. By my construction I secure a more compact frame than if the drag-bar were secured to a heavy casting carried around to the front of the crank disk, as has heretofore been done,—the latter also being a considerably more expensive construction. Furthermore my improved construction is more desirable since the securing of the drag-bar back of the crank disk reduces vibration.

As best shown in Figs. 1, 12, 16 and 24, the drag-bar 70, which is circular in cross section (see Fig. 13), at the end opposite the angularly-disposed portion 72 carries a sleeve 82 connected with a thrust-bar 83 which extends from the rear portion of the frame diagonally forward to the drag-bar, as shown in Figs. 1 and 3. Said thrust-bar forms an angle of about forty-five degrees with the drag-bar, as shown. The rear end of said thrust-bar is pivotally connected with the sleeve 26, or the rear portion of the frame, by a bolt 84 and bracket 85, the latter depending from the frame, as shown in Fig. 3. The forward end of the thrust-bar 83 is connected with the sleeve 82 by a sleeve 86, as best shown in Figs. 1 and 11,—said sleeve 86 being preferably cast with the sleeve 82, so that said sleeves together form a yoke which connects the drag-bar and thrust-bar. The thrust-bar 83 and sleeve 86 are adjustably connected by screwing the end of said thrust-bar into the sleeve, as shown in Fig. 32—a bolt 87 serving to hold the parts rigidly together. The drag-bar 70 fits telescopically into the sleeve 82 and is secured by a bolt 88 similar to the bolt 87.

In Figs. 14 and 15 I have illustrated the form and arrangement of the bolt 88. As therein shown, it is a taper bolt provided with a V-shaped groove 89 thereby forming cutting edges 90 which engage the drag-bar, as shown in Figs. 13 and 14. By tightening the nut 91 the bolt may be forced down to cause it to bite into the drag-bar or other object to be secured. The sleeve 82 is split at the end where the bolt is placed as shown in Fig. 13, so that the bolt also serves to tighten the sleeve on the drag-bar. The construction and arrangement of the sleeve 86 is substantially like that of the sleeve 82. By this construction the drag-bar 70 and thrust-bar 83 are rigidly connected together, but they may be readily adjusted relatively to each other by simply loosening the bolts 87—88 and removing the bolts 84 at the rear end of the thrust-bar 83. It will be apparent also that the drag and thrust bars may be made longer or shorter to adjust the finger-bar shoe and parts connected with it so as to accommodate pitmans of different lengths and keep the pitman perpendicular to the drive-shaft. For example, by moving the sleeves 82 and 86, outwardly upon the drag-bar 70 and thrust-bar 83, respectively, the shoe may be moved outward, i. e. away from the crank disk,—thereby accommodating a pitman of greater length; and similarly the shoe may be moved inward to accommodate a shorter pitman. By pivoting the opposite ends of said drag-bar and thrust-bar their joined ends are susceptible of vertical movement. For convenience of reference the frame formed by the drag-bar and thrust-bar, above described, will be termed the coupling or "front frame."

A shoe-bracket 71, to which is connected the finger-bar-shoe, as will be hereinafter described, is pivotally connected with the coupling or front frame so that it may swing about a horizontal axis by means of a sleeve 92 which fits upon one end of the drag-bar 70 and projects into a socket 93 formed in the sleeve 82, as shown in Fig. 16. Said sleeve is held in place by a nut 94 and key 95, as shown in said figure. By this construction I provide a bearing between the coupling or front frame and the sleeve 92 which may be termed a telescopic pivot bearing, since the sleeve 92 telescopes in the socket 93 of the coupling frame and is capable of moving endwise therein and also of rocking relatively to the coupling frame.

The shoe-bracket 71 extends longitudinally of the machine and at its ends it is provided with pins 96—97 which form pivots to receive the bearings 98—99 of the shoe 100 so that the latter may swing about an axis which extends longitudinally of the machine in the usual way. By rocking the bracket 71 upon the sleeve 92 the shoe may also be swung in a longitudinal vertical plane to adjust the position of the finger-bar on the ground.

101 indicates the finger-bar, which is rigidly connected with the shoe 100 and extends laterally therefrom in the usual way.

102 indicates the cutter-bar, which is carried by the finger-bar in the usual way. It is reciprocated by means of the pitman 50, hereinbefore referred to, driven by the crank disk 48, as shown in figures 12, 24 and 25.

It will be observed from an inspection of Fig. 1 that the pivot bearing 92 of the shoe-bracket 71 is at the forward end portion of said bracket and also of the shoe, and as in the operation of the machine backward thrust on the finger-bar tends strongly to twist the shoe about a vertical axis I provide a double bearing for the shoe-bracket,—the second bearing, which is a sliding one, being placed to the rear of the other so as to counteract such backward thrust and relieve the sleeve 92 from lateral strain. Such second bearing is best shown at 104 in Figs. 11 and 12. As therein illustrated 105 indicates a block, preferably cast as a part of the sleeve 86, and having a vertical bearing-face lying in the longitudinal plane of the machine. The shoe-bracket 71 is provided with a corresponding block or bearing-portion 106, which fits against and slides upon the bearing-face of the block 105, as shown in Fig. 11. The second bearing thus provided effectually neutralizes the backward thrust on the outer end of the finger-bar and relieves the sleeve 92 from abnormal strain, so that it wears true. Moreover, by providing the two bearings, above described, I am able to adjust the finger-bar to bring the cutter-bar properly in alinement,—this being accomplished by adjusting the sleeve 92 lengthwise upon the drag-bar. The bearing 104 being fixed, adjustment of the sleeve 92 lengthwise of the drag-bar throws the outer end of the finger-bar forward or backward, as the case may be. The double bearing is also advantageous in that it keeps the finger-bar from swinging forward or backward when it is tilted to its vertical position, as it would be apt to do if only a single bearing were provided.

The finger-bar 101 and shoe 100 are tilted to raise the finger-bar to its inoperative or substantially vertical position by means of a lifting-lever 107, which is mounted upon a pivot 108 which projects laterally from the frame 25, as shown in Figs. 1, 22, 27 and 30. Said lever is provided with an upwardly and rearwardly extending arm 109 to which is connected a hand-lever 110 as shown in Fig. 30. It is also provided with an upwardly-extending arm 111, which is connected with a spring 112, the rear end of which is attached to a depending bracket 113 secured to the sleeve 26, as shown in Figs. 20, 22 and 27. As shown in Fig. 20, the upper end of the bracket 113 is bent in the form of a hook and hooks over a support 114 which projects rearwardly from the sleeve 26. The support 114 forms a bearing for the vertical portion of the bracket 113, thereby holding said bracket rigidly in position. The rear end of the spring 112 is connected with the bracket 113 by a bolt 115 carrying a spirally-grooved nut 116,—the grooves of said nut being arranged to receive the coils of the spring, as shown, thus holding the spring properly in position and permitting of its adjustment.

117 indicates a foot-lever, which extends under the sleeve 26, as best shown in Figs. 3, 22 and 30, and is connected with the lever 107 so that said lever may be rocked either by depressing the lever 117 by foot or by throwing back the hand-lever 110, or by using both together. The foot-lever 117 is not rigidly connected with the lever 107, but is pivoted thereto, that said foot-lever may be swung upward independently of the lever 107. This construction is best shown in Fig. 30, from an inspection of which it will be seen that the foot-lever 117 is pivoted at 117$^a$ in a suitable bracket 118$^a$ open at its upper side. The under side of the bracket 118$^a$ is provided with a stop 118, best shown in Figs. 28 and 29, which lies under the lever 117 and supports it when in its normal position. The bracket 118$^a$ is rigidly connected with the lever 107 and arm 109, being preferably cast integral therewith, so that said bracket moves with said arm and lever 110. It will be apparent that by this construction the foot-lever 117 may be swung upwardly independently of the bracket 118$^a$ and lever 110; or, to put the matter in another way, the lever 110 may be thrown backward independently of the foot-lever 117. The object of this construction is to permit the lever 107 to be rocked farther by the hand-lever after the foot-lever 117 has been depressed as far as possible. Usually the axle of the machine is so low that the foot-lever strikes the ground before the finger-bar is raised to its vertical position, and by thus pivoting the foot-lever to the lifting-lever 107 the hand-lever may be employed to continue the raising of the finger-bar after the foot-lever strikes the ground.

The lifting-lever 107 is connected with the finger-bar as follows:—119 indicates a forwardly-projecting arm of the lever 107, which is connected by a chain 120, or other flexible connection, with a lever 121. Said lever 121 is somewhat in the nature of a bell-crank-lever, it having in effect two arms. The chain 120 is connected to said lever by a pin 122 and extends over a bearing-plate 123, preferably cast as a part of said lever 121. 124 indicates the pivot or fulcrum of the lever 121, which connects it with a swinging support or gag-lever 125, as best shown in Fig. 8. Said gag-lever is angular in form and is mounted upon a pivot 126 carried by the block 105. As shown in Fig. 8, said block is provided with a vertical slot 127 into which projects the upwardly-projecting arm of the lever 125,—the pivot 126 being in the lower portion of said slot. Below the pivot 126 the lever 125 extends substantially horizontally under the sleeve 86 and thrust-bar 83, as shown in Figs. 8 and 11,—its upper edge bearing against the under side of said sleeve. The width of the slot 127 is such as to allow a limited amount of lateral movement of the arm 128.

129 indicates a connecting-rod, which connects the lever 121 with a vertically-extending arm 130 carried by the shoe 100 near its rear end and out-side of the pivots 96—97 of the drag-bar 70, as shown in Figs. 1 and 8. The connecting-rod 129 is screw-threaded and screws into the sleeve 131. To prevent unscrewing thereof the sleeve 131 is provided with a longitudinal slot 133, and a split key 134 is passed through the end portion of said connecting-rod,—its ends projecting into the slot 133.

When the finger-bar is in its operative position, as shown in Fig. 4, the pivot 122 lies substantially under the pivot 124, and the pivots 122 and 132 are substantially in the horizontal plane of the connecting-rod 129, as shown in Fig. 4. It will be noted also from an inspection of Fig. 1 that the top of the lever 128 lies slightly forward of a line drawn from the front end of the lever 119 to the point of connection between the rod 129 and the arm 130, said line passing back of the fixed bearing 104, best shown in Figs. 11 and 12. The advantage of this arrangement is that it causes the spring 112 to pull the rear end of the shoe inward, throwing its front end and the front end of the bracket 71 outward so as to press out against, and always be in contact, with the nut 94 while the rear bearing of the shoe-bracket bears against the fixed bearing 104, thus making unnecessary the use of an overlapping lug or guide. By this construction also the outer end of the finger-bar is thrown back with sufficient force to hold it in proper position when the mower is backed, the thrust on the nut 94 being outward. By adjusting the nut 94 the sleeve 92 may be adjusted longitudinally of the shaft 70 and the outer end of the finger-bar may accordingly be adjusted forward or backward to secure its proper alinement. When the finger-bar is in operative position the thrust-bar 83 lies a short distance below the frame 25. When the lifting-lever is operated, however, to raise the finger-bar the front portion of the front frame with the shoe and finger-bar are raised all together without tilting the finger-bar to any considerable extent until the thrust-bar strikes the under side of the frame 25, which prevents its further upward movement. Preferably I provide a bearing-block 135 against which the thrust-bar 83 is adapted to bear, as shown in Fig. 10. When the thrust-bar strikes the bearing-block 135 further rocking of the lifting-lever acts through the chain 120 to rock the lever 121, moving it toward the position shown in Fig. 8, and thereby swinging the arm 130 and raising the finger-bar to its more or less nearly vertical position. This movement is due to the fact that less power is required to raise the front portion of the frame and finger-bar horizontally than is necessary to tilt the finger-bar about the pivots 96—97. The object of employing the gag-lever 125 is to allow a certain amount of vertical play of the shoe independently of the outer end of the finger-bar. It will be observed that the outer or left-hand end of the drag-bar being pivotally connected the shoe may rise and fall freely to a limited extent, as may be necessary to ride over inequalities in the ground.

The shoe-bracket 71 may be rocked to swing the shoe about the pivot 92 by means of a lever 135ª, which is mounted upon the frame of the machine as shown in Fig. 22 and is connected by a connecting-rod 136 to an arm 137 rising from the bracket 71, as shown in Figs. 11, 22 and 25.

If desired, the draft of the team may be applied more or less directly to the shoe by means of a series of links 138—139—140—141. As shown in Fig. 1, the link 138 is connected at its front end to the whiffle-tree 142, and at its rear end to the link 141, which, as best shown in Fig. 2, is a somewhat elongated link having its sides indented or inwardly curved so as to form a comparatively narrow passage 141ª connecting the larger spaces 141ᵇ—141ᶜ at the end portions of the link. The forward end of the link 139 is connected with the link 141,—its rear end being connected with an arm 143 rising from the forward portion of the shoe-bracket 71, as shown in Figs. 1 and 11. The forward portion of the link 140 is connected with the link 141, and its rear portion with a lug 144 attached to the sleeve 82 or to any other suitable part of the front frame, as may be desired. When it is desired to have the draft of the team applied more directly to the forward portion of the shoe the several links are arranged as shown in Fig. 1,—the links 138 and 139 being substantially in alinement and both lying in the forward loop of the link 141. If it be desired to apply the draft of the team to the drag-bar, instead of to the shoe, the link 138 is shifted to the rear loop of the link 141, so that it is brought substantially into alinement with the link 140 as shown in Fig. 23. The line of draft is thus made more nearly central of the machine. The former arrangement is employed for cutting heavy grass, while the latter is for lighter work.

The driving gears are automatically thrown out of operation, when either the hand lever 110 or the foot lever 117 is operated to actuate the lifting lever 107 so as to raise the finger-bar to its vertical position, by means of a sliding bar 145, best shown in Figs. 3, 28 and 30. Said sliding bar is pivotally connected near its forward end by a pivot 146 with the bracket 118$^a$,—the front end of the bar 145 being bent at a proper angle, as shown in Figs. 27 and 29, and fitted in downwardly-projecting ears 147$^a$ carried by said bracket, as shown in Figs. 29 and 30. From said pivot the bar 145 extends backward under the frame of the machine, as shown in Fig. 3, and engages one end portion of a rod 148 which is adjustably connected with the head 64, as shown in Figs. 3 and 26. Preferably the rod 148 is provided with a loop or hook 153 through which the bar 145 extends. At its rear end the bar 145 is made somewhat wider, as shown at 150 in Fig. 28, and is provided with an inclined edge 151 which is adapted to engage the loop or hooked portion of the rod 148 in such manner as to move said rod 148 longitudinally when the bar 145 is actuated. The arrangement is such that when the bar 145 is moved forward the rod 148 is moved in the direction indicated by the arrow in Fig. 28, thereby moving the clutch section 57 out of engagement with the clutch section 56. A guide 152 secured to the frame of the machine serves to hold the rod 148 and the rear end of the bar 145 in position, as shown in Fig. 30.

The bar 145 is moved forward whenever either the hand lever 110 or the foot lever 117 is actuated; but the parts are so adjusted that the inclined portion 151 of the bar 145 does not operate to disconnect the clutch members unless said levers are thrown back far enough to raise the finger-bar to substantially an angle of 45°, since it is not ordinarily desirable to stop the cutter bar if the finger-bar is raised only a short distance, as in passing an obstruction.

149 indicates a spring which is used to carry the foot-lever clear of the ground when the lever 110 is thrown back and the finger-bar is in its vertical position. As best shown in Figs. 28, 29 and 30, one end of said spring is connected to a lug or projection 154 which depends from the forward end of the lever 117, its rear end being connected to a lug 155 depending from the forward end of the bar 145. By this construction when the lever 110 is thrown backward and the bar 145 drawn forward by reason of such movement of the lever the lug 155 actuates the spring 149 to cause it to hold up the lever 117 to keep it clear of the ground.

I have now particularly described the construction of my improved mower as illustrated in the accompanying drawings, but I wish to call especial attention to a number of features which I consider of prime importance, because, so far as I am aware, they are generically new. The provision of a second bearing to take the lateral thrust of the shoe or shoe-bracket arising from rearward pressure on the outer end of the finger-bar is especially advantageous, and is, as I believe, wholly new. By this means not only can the cutter-bar be alined with the pitman, when by wear it gets out of line, but also, when the shoe-bracket is tilted, the finger-bar rises without swinging backward or forward. Moreover, the parts are greatly strengthened, and the pivot of the shoe-bracket is prevented from wearing improperly.

Another important and novel feature is the arrangement of the drag-bar in front of the crank disk, and its connection with the forward portion of the shoe so that the tendency of the draft is to tilt the forward portion of the shoe upward rather than downward as is the case where the connection is made with the rear portion of the shoe. This not only makes the frame of the machine stronger, but gives a drawing or pulling effect on the shoe and finger-bar instead of a pushing effect, as where the connection is at the rear of the shoe. This advantage is particularly noticeable when the finger-bar strikes an obstruction, as with my improved arrangement the effect is to pull lengthwise on the drag-bar instead of to press it laterally as is the case in the older constructions where the connection is at the rear of the shoe.

A further feature of importance is the making of the drag-bar of one piece and extending it back of the crank disk around across the front of the machine to the forward portion of the shoe; also the pivotal connection of the drag-bar at the crank-disk side of the machine so that the shoe may rise and fall independently in passing over inequalities in the ground. Incidentally, this also permits either end of the finger-bar to be raised or lowered independently of the other.

Another important feature is the provision of automatic mechanism for throwing the driving mechanism out of operation when the finger-bar is tilted to its higher position, in connection with hand-operated mechanism for accomplishing the same end.

Still another very important part of my invention is the lifting mechanism by which the front portion of the frame, together with the shoe and finger-bar, are first lifted substantially horizontally, and the tilting of the finger-bar is effected after the shoe has been lifted to a certain point; also the construction of the lifting mechanism so that it does not interfere with the independent rising and falling of the shoe; and the arrangement of the hand and foot levers so that they supplement each other for the first part of the lifting operation, while the foot-lever does not interfere with the completion of the operation by the hand-lever.

I also consider important the arrangement of the driving gears by which the drive shaft is provided with bearings at opposite sides of the gears, and the gears are so arranged as to compensate—*i. e.*, the lateral thrust at the outer margin of the bevel gear is compensated for by the inward thrust upon the spur gear.

In addition to the foregoing, my invention also includes a number of other improvements, which are particularly set forth in the claims.

That which I claim as my invention and desire to secure by Letters Patent is,—

1. In a mower, the combination of a frame, a finger-bar projecting laterally at one side of said frame, means connecting said finger-bar with said frame, an endwise adjustable pivot bearing and a sliding bearing between said connecting means and said frame, said connecting means being adapted to swing upon said bearings to rock the finger-bar about its longitudinal axis.

2. In a mower, the combination of a frame, a finger-bar projecting laterally at one side of said frame, means connecting said finger-bar with said frame, an endwise adjustable pivot bearing and a sliding bearing between said connecting means and said frame, said sliding bearing being back of said pivot bearing, said connecting means being adapted to swing upon said bearings to rock the finger-bar about its longitudinal axis.

3. In a mower, the combination of a frame, a shoe-bracket connected with the frame and pivoted to swing about an axis substantially perpendicular to the line of draft, said shoe-bracket having a sliding bearing upon the frame at a point back of the pivot of said bracket, a finger-bar connected with said shoe-bracket, and means for adjusting said shoe-bracket to maintain the alinement of the finger-bar.

4. In a mower, the combination of a frame, a finger-bar projecting laterally at one side of said frame, means connecting said finger-bar with said frame, an endwise adjustable pivot bearing and a sliding bearing between said connecting means and said frame, said connecting means being adapted to swing upon said bearings to rock the finger-bar about its longitudinal axis, mechanism for raising the finger-bar out of operative position, and mechanism for swinging said finger-bar about said bearings.

5. In a mower, the combination of a frame, a finger-bar, a shoe-bracket connecting said finger-bar with the frame, said shoe-bracket being adapted to rock to turn the finger-bar about its longitudinal axis and having front and rear bearings on the frame, one of said bearings being forward of the finger-bar, and means for adjusting said shoe-bracket to maintain the alinement of the finger-bar.

6. In a mower, the combination of a frame, a finger-bar projecting laterally at one side of said frame, means connecting said finger-bar with said frame, and a pivot bearing and a sliding bearing between said connecting means and said frame, said pivot bearing being forward of said finger-bar and being adjustable transversely of the frame, said connecting means being adapted to swing upon said bearings to rock the finger-bar about its longitudinal axis.

7. In a mower, the combination of a frame having a transversely-disposed drag-bar and a thrust-bar connected therewith, a shoe-bracket pivotally mounted upon and between the ends of said drag-bar and adapted to rock about said drag-bar as an axis and adjustable longitudinally thereof, means upon the finger-bar end of the drag-bar for adjusting the position of said bracket longitudinally thereof, a shoe connected with said bracket, and a finger-bar connected with said shoe.

8. In a mower, the combination of a transversely-disposed drag-bar, a thrust-bar, a sleeve connected to said thrust-bar, a shoe-bracket having a pivot telescopically fitted to said sleeve and adjustable endwise relatively thereto, adjustable means for taking the end-thrust of said shoe-bracket, a shoe connected with said shoe-bracket, and a finger-bar connected with said shoe.

9. In a mower, the combination of a transversely-disposed drag-bar, a thrust-bar, a sleeve connected with said drag-bar, a shoe-bracket having a pivot telescopically fitted to said sleeve and movable endwise relatively thereto, said drag-bar extending through said pivot, means adjustably connected with said drag-bar for taking the end thrust of said shoe-bracket, a shoe connected with said shoe-bracket, and a finger-bar connected with said shoe.

10. In a mower, the combination of a machine frame, a sleeve extending forward at one side thereof, a drive-shaft mounted in said sleeve, a crank carried by said drive-shaft near its forward end, a pitman connected with said crank and extending transversely of the machine, a drag-bar pivoted back of said crank to rock about said drive-shaft as an axis and extending transversely of the machine in advance of said pitman, a shoe-bracket pivoted to rock about said drag-bar as an axis, a shoe connected with said shoe-bracket, a finger-bar, a cutter-bar connected with said pitman, and a thrust-bar.

11. In a mower, the combination of a machine frame, a sleeve extending forward at one side thereof, a drive-shaft mounted in said sleeve, a crank carried by said drive-shaft near its forward end, a pitman connected with said crank and extending transversely of the machine, a drag-bar pivoted back of said crank to rock about said drive-shaft as an axis and extending transversely of the machine in advance of said pitman, a shoe-bracket pivoted to rock about said drag-bar as an axis, a shoe connected with said shoe-bracket, a finger-bar connected with said shoe, a cutter-bar connected with said pitman, and a thrust-bar.

12. In a mower, the combination of a machine frame, a sleeve extending forward at one side thereof, a drive-shaft mounted in said sleeve, a crank carried by said drive-shaft near its forward end, a pitman connected with said crank and extending transversely of the machine, a drag-bar pivoted back of said crank to rock about said drive-shaft as an axis and extending transversely of the machine in advance of said pitman, a shoe-bracket pivoted to rock about said drag-bar as an axis, a shoe connected with said shoe-bracket, a finger-bar, a cutter-bar connected with the pitman, a thrust-bar, and a bearing for said shoe-bracket back of the pivot thereof.

13. In a mower, the combination of a coupling-frame, a finger-bar, a lifting-lever, a swinging support connected with the coupling-frame and adapted to swing transversely of the machine independently of the coupling frame, and means connecting said lifting-lever with the finger-bar for lifting the same, said connecting means comprising a part fulcrumed on said swinging support.

14. In a mower, the combination of a coupling-frame, a finger-bar, a lifting-lever, a swinging support connected with the coupling-frame and adapted to swing transversely of the machine independently of the coupling frame, means connecting said lifting-lever with the finger-bar for lifting the same, said connecting means comprising a part fulcrumed on said swinging support, and means for limiting the movement of said swinging support.

15. In a mower, the combination of a coupling-frame, a finger-bar, a lifting-lever, a swinging support connected with the coupling-frame and adapted to swing transversely of the machine independently of the coupling frame, and means connecting said lifting-lever with the finger-bar for lifting the same, said connecting means comprising a rocking lever fulcrumed upon the swinging support.

16. In a mower, the combination of a machine frame, a finger-bar, a cutter-bar carried thereby, means including clutch mechanism, operated by the forward movement of the machine for driving said cutter-bar, means for lifting said finger-bar to inoperative position, and means for automatically throwing said driving mechanism out of operation when said finger-bar is raised to inoperative position, comprising a longitudinally-movable rod having a loop at one end thereof, a bar movable transversely with reference to said rod said bar having sliding engagement with a part of the machine frame, and having an inclined surface coöperating with said loop to move said rod longitudinally, means operated by the lifting of the finger-bar for moving said bar to actuate said rod, and means actuated by said rod when the same is moved longitudinally for disconnecting said clutch mechanism.

17. In a mower, the combination of a machine frame, a lifting lever, a rocking lever connected with said lifting lever, a pivotally mounted gag-lever on one arm of which said rocking lever is fulcrumed, a finger-bar, means connecting said rocking lever with said finger-bar, and means for limiting the movement of said gag-lever.

18. In a mower, the combination of a machine frame, a finger-bar, a lifting lever, a rocking lever, a flexible connection between said lifting lever and one of the arms of said rocking lever, a gag lever pivotally mounted between its ends, said rocking lever being fulcrumed upon one of the arms thereof, and means for limiting the movement of said gag lever.

19. In a mower, the combination of a frame, a finger-bar, means pivotally connecting said finger-bar with the frame, said connecting means being adapted to rock to turn the finger-bar about the longitudinal axis of said finger-bar, the front portion of said connecting means having an extension telescopically pivoted upon the frame forward of the finger-bar and the rear portion of said connecting means having a sliding bearing on said frame.

20. In a mower, the combination of a machine frame, a front frame, a shoe connected with said front frame, a finger-bar connected with said shoe, draft devices, means connecting the draft devices with the front frame adjacent to the shoe, means connecting the draft devices with the front frame near the center of the machine, and adjustable means for varying the direction of the line of draft as applied to said front frame.

21. In a mower, the combination of a machine frame, a coupling frame, a shoe connected with said coupling frame, a finger-bar connected with said shoe, draft devices, and means connecting the draft devices with the coupling frame adjacent to the shoe and with the coupling frame near the center of the machine, comprising an approximately 8-shaped link, and connecting links for varying the line of direction of the draft as applied to said coupling frame.

22. In a mower, the combination of a frame, a finger-bar, means pivotally connecting said finger-bar with the frame, said connecting means being adapted to rock to turn the finger-bar about the longitudinal axis of said finger-bar, the front portion of said connecting means being pivoted upon the frame forward of the finger-bar and the rear portion of said connecting means having a sliding bearing on said frame, and means for adjusting the pivot bearing of said connecting means to maintain the alinement of the finger-bar.

23. In a mower, the combination of a coupling frame, a lifting lever, a rocking lever connected with said lifting lever, a swinging support mounted on said coupling frame to swing transversely independently thereof, said rocking lever being fulcrumed on said swinging support, a drag-bar, a finger-bar, and means connecting said rocking lever with said finger-bar whereby said finger-bar may be raised and lowered by rocking said rocking lever.

24. In a mower, the combination of a machine frame, a forwardly-extending drive-shaft, a crank at the forward end of said drive-shaft, a sleeve surrounding said drive-shaft, a casting pivoted back of said crank to rock about the drive-shaft as an axis, a pitman connected with said crank and extending transversely of the machine, a drag-bar rigidly secured to said casting and extending transversely of the machine forward of the pitman, a shoe bracket pivotally connected with said drag-bar so as to rock about said drag-bar as an axis and adjustable longitudinally thereof, a thrust-bar connected with said drag-bar, a finger-bar connected with said shoe bracket and a cutter-bar connected with said pitman.

25. In a mower, the combination of a frame, a finger-bar, a gag lever, a bell-crank lever fulcrumed on the gag lever, means connecting said bell-crank lever with the finger-bar, and means for actuating said bell-crank lever.

26. In a mower, the combination of a coupling frame, a finger-bar, a rocking lever, means for rocking said lever, means connecting said rocking lever with the finger-bar so that when said lever is rocked said finger-bar will be raised or lowered as the case may be, and a swinging support on which said rocking lever is fulcrumed, said support being mounted on said coupling frame and being movable in a substantially vertical plane independently thereof.

27. In a mower, the combination of a frame, a finger-bar connected therewith, a rocking lever, means for rocking said lever, means connecting said rocking lever with the finger-bar so that when said lever is rocked said finger-bar will be raised or lowered as the case may be, a swinging support mounted on the frame, said rocking lever being fulcrumed on said swinging support, and being movable in a substantially vertical plane independently thereof, and a stop for limiting the movement of said swinging support.

28. In a mower, the combination of a coupling frame, a finger-bar, a rocking lever, means for rocking said lever, means connecting said rocking lever with the finger-bar so that when said lever is rocked said finger-bar will be raised or lowered as the case may be, a swinging support on which said rocking lever is fulcrumed, said swinging support being mounted on the coupling frame and being movable in a substantially vertical plane independently thereof, and a stop for limiting the extent to which said support may swing.

29. In a mower, the combination of a coupling frame, a finger-bar, a rocking lever, means for rocking said lever, means connecting said rocking lever with the finger-bar so that when said lever is rocked said finger-bar will be raised or lowered as the case may be, and a swinging support on which said lever is mounted, said swinging support having a limited movement in a substantially vertical plane independently of said coupling frame and being arranged to transmit to the coupling frame lifting force applied to said rocking lever.

30. In a mower, the combination of a coupling frame, a finger-bar projecting laterally at one side thereof, connecting means connecting said finger-bar with said frame, a shoe, front and rear bearings between said connecting means and the frame, one of said bearings being forward of the finger-bar, and being adjustable transversely of the frame and means for exerting inward pull on the rear end of the shoe.

31. In a mower, the combination of a coupling frame, a finger-bar, a lifting lever, a movable support connected with the coupling frame and having a limited movement in a substantially vertical plane independently of said coupling frame and connecting means connecting said finger-bar and said lifting lever so that the finger-bar may be lifted by actuating said lever comprising a part fulcrumed on said movable support.

32. In a mower, the combination of a coupling frame, a finger-bar, a lifting lever, a movable support connected with the coupling frame and having a limited movement in a substantially vertical plane independently of said coupling frame, connecting means connecting said finger-bar and lifting-lever and comprising a part fulcrumed on said movable support, and means limiting the movement of said support.

33. In a mower, the combination of a coupling frame, a finger-bar, a lifting lever, connecting means connecting said finger-bar and lifting lever, and a support pivotally mounted on the coupling frame so as to swing vertically independently thereof and extending under and adapted to engage a portion thereof, said connecting means comprising a part fulcrumed on said support below the coupling frame.

34. In a mower, the combination of a frame, a finger-bar projecting laterally at one side of the frame, means comprising a member telescoping in a bearing provided on the frame for connecting said finger-bar with said frame, and adjustable means for limiting the endwise movement of said member in said bearing.

35. In a mower, the combination of a frame having a transversely-extending drag-bar, a sleeve mounted on said drag-bar, a thrust-bar connected with said sleeve, a shoe-bracket having an extension integral therewith telescopically fitted in said sleeve and mounted upon said drag-bar, and means mounted upon the end of said drag-bar for holding said extension in said sleeve and taking the end thrust of said shoe-bracket.

36. In a mower, the combination of a supporting-frame, a lifting lever, a rocking lever connected with said lifting lever, a swinging support mounted on said frame to swing transversely independently thereof, said rocking lever being fulcrumed on said swinging support, a drag-bar, a finger-bar, means connecting said rocking-lever with said finger-bar whereby said finger-bar may be raised and lowered by rocking said lever, and means for limiting the movement of said swinging support.

37. In a mower, the combination of a machine frame, a finger-bar, a lifting lever mounted on said frame, a swinging support mounted on said frame to swing transversely independently thereof, a rocking lever fulcrumed on said swinging support, a flexible connection between said lifting lever and one of the arms of said rocking lever, and a connection between said rocking lever and said finger-bar.

38. In a mower, the combination of a coupling frame, a finger-bar, a lifting lever, a rocking lever connected with said lifting lever and with said finger-bar, and a traveling fulcrum for said rocking lever, said fulcrum being movable in a plane transverse to the line of draft independently of the coupling frame.

39. In a mower, the combination of a coupling frame, a finger-bar, a lifting lever, a rocking lever connected with said lifting lever and with said finger-bar, and a traveling fulcrum for said rocking lever, said fulcrum having a limited movement independently of the coupling frame and transversely of the machine.

40. In a mower, the combination of a coupling frame, a finger-bar, a lifting lever, a rocking lever connected with said lifting lever and with said finger-bar, a swinging support on which said rocking lever is fulcrumed, said swinging support having a limited movement in a plane transverse to the line of draft independently of the coupling frame.

JOSEPH DAIN.

Witnesses:
JOHN L. JACKSON,
MINNIE A. HUNTER.

Copies of this patent may be obtained for five cents each, by addressing the "Commissioner of Patents, Washington, D. C."